United States Patent
Sundar Pal et al.

(10) Patent No.: US 11,086,327 B2
(45) Date of Patent: Aug. 10, 2021

(54) METHOD AND SYSTEM FOR DETERMINING SAFE NAVIGATION OF AUTONOMOUS VEHICLE

(71) Applicant: WIPRO LIMITED, Bangalore (IN)

(72) Inventors: Shyam Sundar Pal, Kolkata (IN); Gopinath Das, Balasore (IN)

(73) Assignee: Wipro Limited, Bangalore (IN)

( * ) Notice: Subject to any disclaimer, the term of this patent is extended or adjusted under 35 U.S.C. 154(b) by 153 days.

(21) Appl. No.: 16/225,380

(22) Filed: Dec. 19, 2018

(65) Prior Publication Data

US 2020/0142418 A1 May 7, 2020

(30) Foreign Application Priority Data

Nov. 5, 2018 (IN) .............................. 201841041806

(51) Int. Cl.
| | | |
|---|---|---|
| *G05D 1/02* | (2020.01) | |
| *G01C 21/34* | (2006.01) | |
| *G05D 1/00* | (2006.01) | |
| *G08G 1/01* | (2006.01) | |
| *G08G 1/0967* | (2006.01) | |

(52) U.S. Cl.
CPC ....... *G05D 1/0214* (2013.01); *G01C 21/3415* (2013.01); *G01C 21/3492* (2013.01); *G05D 1/0088* (2013.01); *G05D 1/0276* (2013.01); *G08G 1/0116* (2013.01); *G08G 1/0141* (2013.01); *G08G 1/096725* (2013.01); *G05D 2201/0213* (2013.01)

(58) Field of Classification Search
None
See application file for complete search history.

(56) References Cited

U.S. PATENT DOCUMENTS

| | | |
|---|---|---|
| 8,170,739 B2 | 5/2012 | Lee |
| 9,528,838 B2 | 12/2016 | Okumara |
| 2013/0304279 A1 | 11/2013 | Mudalige et al. |
| 2014/0058652 A1 | 2/2014 | Duan et al. |
| 2017/0200374 A1 | 7/2017 | Yanagihara et al. |
| 2017/0309171 A1* | 10/2017 | Zhao ..................... G08G 1/0112 |
| 2019/0011275 A1* | 1/2019 | Whinston .......... G01C 21/3492 |
| 2019/0278277 A1* | 9/2019 | Tao ....................... G05D 1/0257 |
| 2020/0073966 A1* | 3/2020 | Fowe .................. G01C 21/3658 |

* cited by examiner

*Primary Examiner* — Tamara L Weber
(74) *Attorney, Agent, or Firm* — Finnegan, Henderson, Farabow, Garrett & Dunner, LLP (57) ABSTRACT

The present disclosure discloses method and an Electronic Control Unit (ECU) of an autonomous vehicle for determining safe navigation. The ECU determines current location of vehicle based on orientation and location information of vehicle. One or more pre-defined vehicle parameters and surrounding infrastructure data is determined. Traffic density at current route of vehicle is determined based on surrounding infrastructure data and current location of vehicle. The ECU predicts traffic density at one or more alternate routes for predefined time and distance from current location of vehicle, based on traffic information received from surrounding infrastructure data for one or more alternate routes. Thereafter, route is selected based on one or more pre-defined vehicle parameters, traffic density at current route and traffic density at one or more alternate routes for safely navigating vehicle. The present disclosure provides safe navigation route for vehicle based on predicted traffic and accurate location of vehicle.

33 Claims, 4 Drawing Sheets

METHOD AND SYSTEM FOR DETERMINING SAFE NAVIGATION OF AUTONOMOUS VEHICLE

TECHNICAL FIELD

The present subject matter is related in general to autonomous vehicle, more particularly, but not exclusively to a method and system for determining safe navigation of autonomous vehicle.

BACKGROUND

In recent time operation of modern vehicles is becoming more autonomous, i.e., being able to provide driving control with minimal or no manual intervention. Vehicular ad-hoc network-based driver assistance systems allow a wireless vehicle communications system, such as a dedicated short-range communication (DSRC) system to transmit messages to other vehicles in an area with warning messages about driving conditions. In these systems, multi-hop geofact routing protocols are commonly used to extend reachability of the warning messages, i.e., to deliver active messages to vehicles which may be a few kilometres away, as a one-time multi-hop transmission process. Vehicle-to-Vehicle (V2V) and Vehicle-to-Infrastructure (V2X) communications systems require a minimum of one entity to send information to another entity. For example, various V2V safety applications can be executed on one vehicle by simply receiving broadcast messages from a neighbouring vehicle. These messages are not directed to any specific vehicle but are meant to be shared with a vehicle population to support safety application. In such types of applications where collision avoidance is desirable, as two or more vehicles talk to each other and a collision becomes probable, vehicle systems can warn the vehicle drivers, or possibly take evasive action for the driver, such as applying the brakes. Likewise, traffic control units can observe the broadcast of information and generate statistics on traffic flow through a given intersection or roadway.

Generally, when roads cross intersections are created, types of traffic control mechanisms such as, stop signs, yield signs, traffic lights, and the like are provided to prevent vehicles from colliding with each other at an intersection and the vehicles at perpendicularly or cross traveling traffic can navigate safely through the intersection. However, intersections, especially high traffic intersections, are still cause of many traffic collisions. Further, traffic travelling in one direction is generally stopped at busy intersections to allow traffic to flow in another direction, which would result in traffic congestion at intersection and may lead to frustration for occupants of the vehicle. Thus, navigating at busy intersections with autonomous driving is a technically challenging and an unresolved problem. Current techniques typically employ a central arbiter module, such as an intersection manager, to resolve space-time conflicts between vehicles and dispatch space-time reservations to communication equipped vehicles approaching the intersection. However, practicality of such an arbiter module to resolve conflicts and reserve space-time slots in a timely manner is unknown due to maintenance and operation issues of a computationally complex arbiter at traffic intersections.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure may relate to a method for determining safe navigation of an autonomous vehicle. The method includes determining current location of the autonomous vehicle, at an instant of time, based on orientation and location information of the autonomous vehicle. The method includes determining one or more predefined vehicle parameters and surrounding infrastructure data. The method includes determining traffic density at current route of the autonomous vehicle for a predefined time and distance from the current location of the vehicle based on the surrounding infrastructure data for the current route and the current location of the autonomous vehicle. Further, the method includes predicting traffic density at one or more alternate routes for a predefined time and distance from the current location of the autonomous vehicle, based on surrounding infrastructure data for the one or more alternate routes. Thereafter, the method includes selecting a route for navigating the autonomous vehicle based on the one or more predefined vehicle parameters, the traffic density at the current route and the traffic density at the one or more alternate routes for safely navigating the autonomous vehicle.

In an embodiment, the present disclosure may relate to an Electronic Control Unit (ECU) of an autonomous vehicle for determining safe navigation of the autonomous vehicle. The ECU may include a processor and a memory communicatively coupled to the processor, where the memory stores processor executable instructions, which, on execution, may cause the ECU to determine current location of the autonomous vehicle, at an instant of time, based on orientation and location information of the autonomous vehicle, identify one or more pre-defined vehicle parameters and surrounding infrastructure data. The ECU determines traffic density at current route of the autonomous vehicle for a predefined time and distance from the current location of the autonomous vehicle based on the surrounding infrastructure of the current route and the current location of the autonomous vehicle. Further, the ECU predicts traffic density at one or more alternate routes for a predefined time and distance from the current location of the vehicle, based on surrounding infrastructure data for the one or more alternate routes. Thereafter, the ECU selects a route for navigating the autonomous vehicle based on the one or more predefined vehicle parameters, the traffic density at the current route and the traffic density at the one or more alternate routes for safely navigating the autonomous vehicle.

In an embodiment, the present disclosure relates to a non-transitory computer readable medium including instructions stored thereon that when processed by at least one processor may cause an Electronic Control unit (ECU) of an autonomous vehicle to determine current location of the autonomous vehicle, at an instant of time, based on orientation and location information of the autonomous vehicle, identify one or more pre-defined vehicle parameters and surrounding infrastructure data. The instruction causes the processor to determine traffic density at current route of the autonomous vehicle for a predefined time and distance from the current location of the autonomous vehicle based on the surrounding infrastructure of the current route and the current location of the autonomous vehicle. Further, the instruction causes the processor to predict traffic density at one or more alternate routes for a predefined time and distance from the current location of the vehicle, based on surrounding infrastructure data for the one or more alternate routes. Thereafter, the instruction causes the processor to select a route for navigating the autonomous vehicle based on the one or more predefined vehicle parameters, the traffic density at the current route and the traffic density at the one or more alternate routes for safely navigating the autonomous vehicle.

The foregoing summary is illustrative only and is not intended to be in any way limiting, in addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular forms disclosed, but on the contrary, the disclosure is to cover all modifications, equivalents, and alternative falling within the scope of the disclosure.

The terms "comprises", "comprising" or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure relates to a method and an Electronic Control Unit (ECU) of an autonomous vehicle for determining a safe navigation of the autonomous vehicle. In an embodiment, the autonomous vehicle refers to a driverless vehicle. Typically, autonomous vehicles may follow a pre-defined route based on a source and a destination point. At any instance of time while the autonomous vehicle is moving, the ECU of the autonomous vehicle may determine current location of the vehicle based on orientation and location information of the autonomous vehicle along with predefined vehicle parameters and surrounding infrastructure data at the current location. Traffic density in current route of the autonomous vehicle is determined based on the surrounding infrastructure data for the current route and the current location of the autonomous vehicle. In addition, the traffic density is predicted at one or more alternate routes from the current location of the autonomous vehicle based on the surrounding infrastructure data for the one or more alternate routes. Thereafter, a route is selected based on the predefined vehicle parameters, the traffic density at the current route and the traffic density at the one or more alternate routes for safely navigating the autonomous vehicle. The present disclosure provides safe navigation route for autonomous vehicle based on the predicted traffic and accurate location of vehicle.

Figure 1:
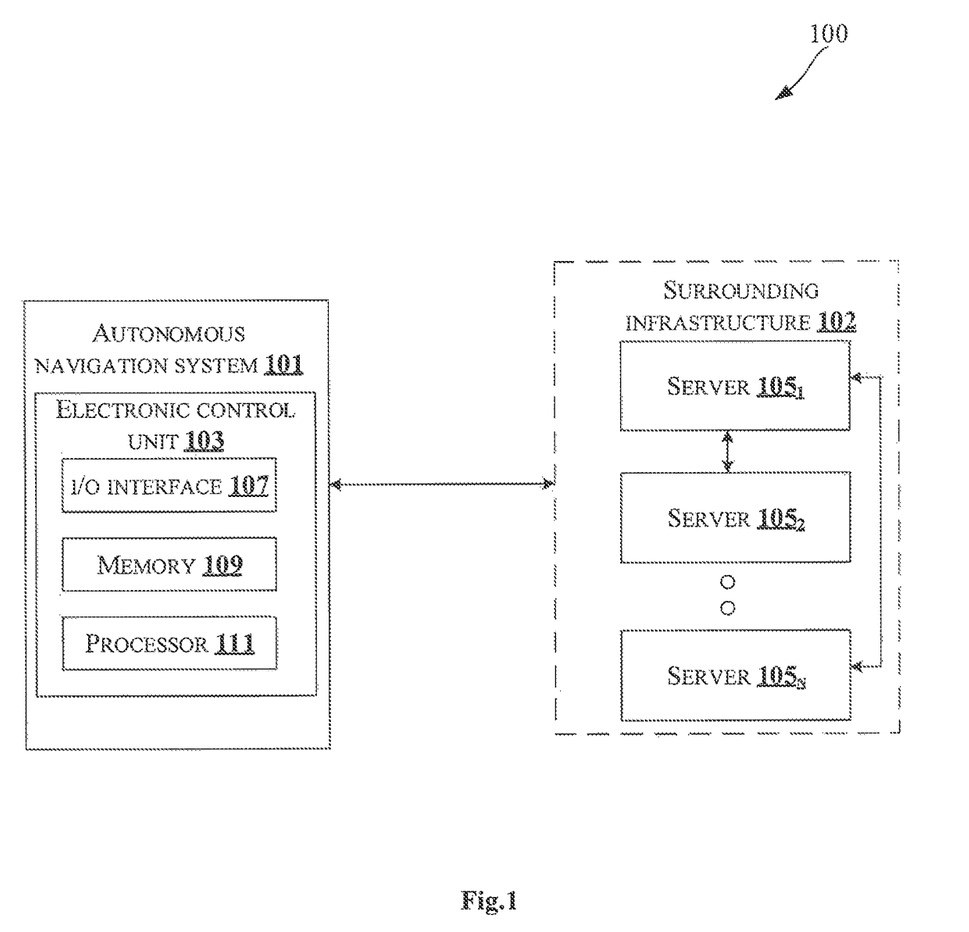
FIG. 1 illustrates an exemplary environment for determining safe navigation of autonomous vehicle in accordance with some embodiments of the present disclosure.

FIG. 1 illustrates an exemplary environment for determining safe navigation of autonomous vehicle in accordance with some embodiments of the present disclosure.

As shown in FIG. 1, an environment includes an autonomous navigation system 101 of an autonomous vehicle moving in a predefined route in accordance with some embodiments of the present disclosure. As shown in FIG. 1, the autonomous navigation system 101 includes an Electronic Control Unit (ECU) 103. A person skilled in the art would understand that the autonomous navigation system 101 may include any other units, not mentioned explicitly in the present disclosure. The ECU 103 of the autonomous vehicle may be used for determining safe navigation of autonomous vehicle. As shown in FIG. 1, the autonomous navigation system 101 is connected to surrounding infrastructure 102 through communication network (not shown explicitly in FIG. 1) while moving in the predefined route. The surrounding infrastructure 102 includes a server 105$_1$, a server 105₂ . . . and a server 105ₙ (collectively referred as plurality of servers 105). In an embodiment, the plurality of servers 105 are used to store information for vehicles on the route. The plurality of servers 105 are connected to each other to provide information of the vehicle along the route. The ECU 103 of the vehicle communicates with the plurality of servers 105 through Vehicle to Infrastructure (V2I) technique. While the vehicle is moving, the ECU 103 may initialize, and configure based on configuration data. In an embodiment, the configuration data includes vehicle configuration parameters used for initializing the vehicle. More details on configuration data is explained in following description. At an instant of time, as the autonomous vehicle moves, the ECU 103 may determine current location of the autonomous vehicle based on orientation and location information of the autonomous vehicle. In an embodiment, the orientation information is determined based on data from Inertial Measurement Unit sensor of the autonomous vehicle. The ECU 103 may further determine one or more pre-defined vehicle parameters and surrounding infrastructure data. In an embodiment, the one or more predefined vehicle parameters include translational speed, turning speed, engine power, vehicles speed limit, vehicles turning capability, vehicle acceleration limit, vehicle deceleration limit, vehicle tyre pressure and vehicle weight. A person skilled in the art would understand that the scope of the present invention may encompass any other vehicle parameter, not mentioned herein explicitly. In an embodiment, the surrounding infrastructure data includes maximum deceleration of trailing and front vehicle, maximum acceleration of trailing and front vehicle, maximum speed difference between vehicles in front and rear, minimum headway distance between front and rear vehicle, time before lane change, collision time gain between front and rear vehicles and minimum lateral distance for overtaking vehicles. A person skilled in the art would understand that the scope of the present invention may encompass any other surrounding infrastructure data not mentioned herein explicitly.

Further, the ECU 103 may determine traffic density at the current route of the autonomous vehicle for a predefined time and distance from the current location of the autonomous vehicle, based on the surrounding infrastructure data for the current route and the current location of the autonomous vehicle. In an embodiment, the ECU 103 may receive traffic information on the current route from a server of the plurality of server 105 associated with the current route. In an embodiment, the ECU 103 may determine speed control for the autonomous vehicle based on the traffic density at the current route. Further, the ECU 103 may predict a traffic density at one or more alternate routes available for the autonomous vehicle for a predefined time and distance from the current location of the autonomous vehicle based on the surrounding infrastructure data for the one or more alternate routes. In an embodiment, the ECU 103 may prioritize the one or more alternate routes based on the predicted traffic density. Thereafter, the ECU 103 may select a route for navigating the autonomous vehicle based on the one or more pre-defined vehicle parameters, the traffic density at the current route and the traffic density at the one or more alternate routes for safely navigating the autonomous vehicle. In an embodiment, the ECU 103 may determine an Expected Time of Arrival (ETA) for the autonomous vehicle based on the one or more pre-defined vehicle parameters and a calculated distance of the route. In an embodiment, the ECU 103 may monitor the traffic density at the selected route for a predefined time and distance. Subsequently, the ECU 103 may determine an alternate route for the autonomous vehicle from the one or more alternate routes based on the monitoring. In an embodiment, the present disclosure includes providing continuous feedback by assessing a plurality of configuration parameters and the determined alternate route for the autonomous vehicle.

The ECU 103 may include at least one Central Processing Unit ("CPU" or "processor") 111 and a memory 109 storing instructions executable by the at least one processor 111. The processor 111 may include at least one data processor for executing program components for executing user or system-generated requests. The memory 109 is communicatively coupled to the processor 111. The ECU 101 further includes an Input/Output (I/O) interface 107. The I/O interface 107 is coupled with the processor 111 through which an input signal or/and an output signal is communicated.

Figure 2:
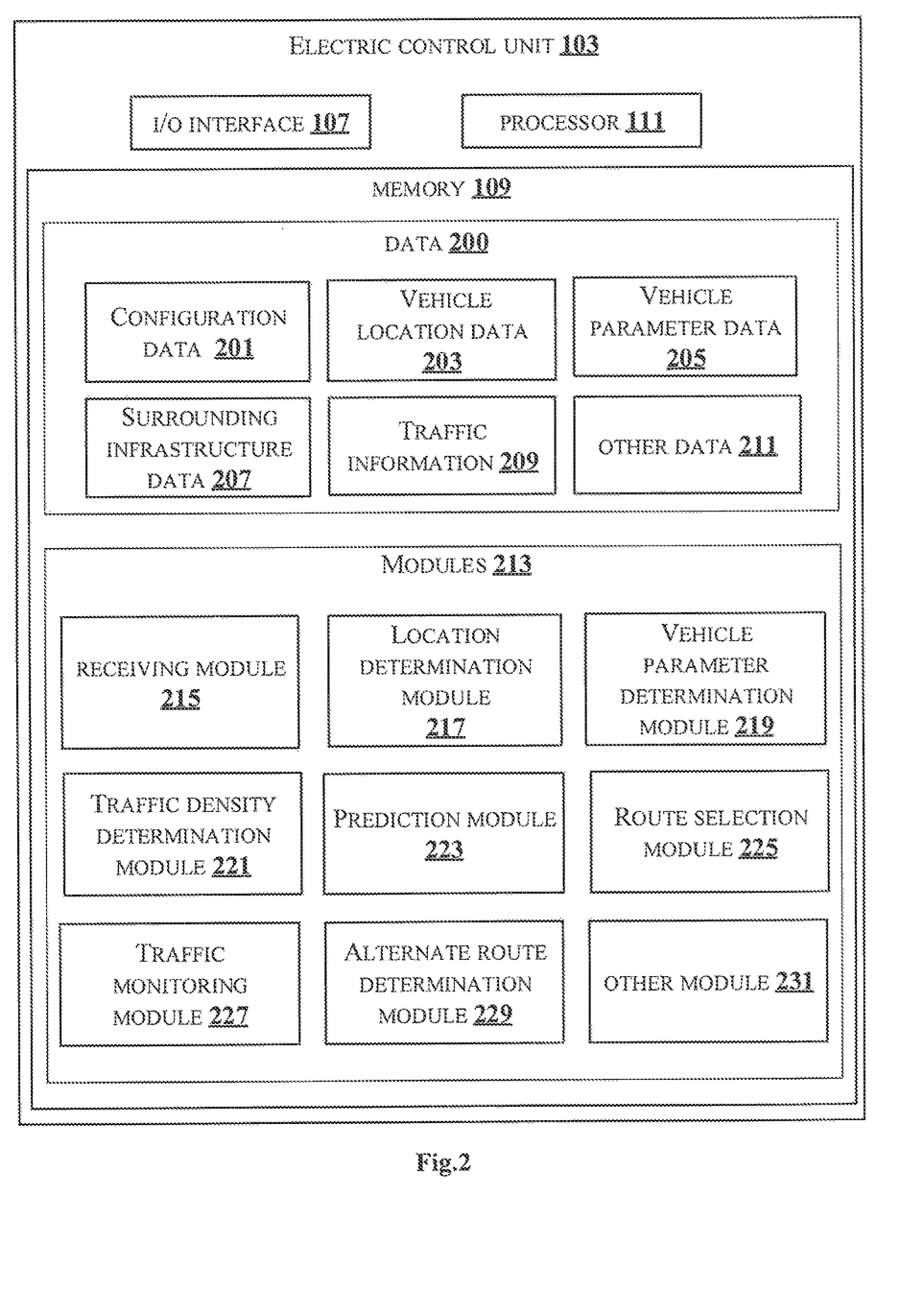
FIG. 2 illustrates an internal architecture of an ECU configured for determining safe navigation of autonomous vehicle in accordance with some embodiments of the present disclosure.

FIG. 2 illustrates an internal architecture of an ECU configured for determining safe navigation of autonomous vehicle in accordance with some embodiments of the present disclosure.

The ECU 103 may include data 200 and one or more modules 213 which are described herein in detail. In an embodiment, data 200 may be stored within the memory 109. The data 200 may include, for example, configuration data 201, vehicle location data 203, vehicle parameter data 205, surrounding infrastructure data 207, traffic information 209 and other data 211.

The configuration data 201 may include details of vehicle configuration parameter such as, threshold coordinates of the autonomous vehicle like, threshold X position ($XPos_{Th}$), threshold Y position ($YPos_{Th}$), threshold distance ($Dist_{Th}$), threshold Timer ($Timer_{Th}$), threshold FOV Area ($FOVArea_{Th}$). The threshold X position is between calculated "x" position from GPS data and "x" position received from the surrounding infrastructure. The threshold X position is used to adjust the "x" position of the autonomous vehicle. The threshold Y position is between calculated "y" position from GPS data and "y" position received from the surrounding infrastructure and is used to adjust the "y" position of the autonomous vehicle. The threshold distance determines frontal coverage of the view of the autonomous vehicle based on distance of the traffic information received and traffic density is predicted. The threshold timer is used to determine duration for calculating the traffic density and may dynamically change depending on the speed of the autonomous vehicle for any instance. The threshold area is determined for calculating the traffic density for a predefined time based on the threshold timer.

The vehicle location data 203 may include the current location of the autonomous vehicle determined based on the orientation and location information of the autonomous vehicle. The location information includes position ($X_{V2X}$, $Y_{V2X}$) of the autonomous vehicle received from the server of the plurality of servers 105 present near to the autonomous vehicle and GPS data (V_lat, V_long) for the vehicle location. Further, the vehicle location data 203 includes the data from the IMU unit of the autonomous vehicle for determining the orientation of the autonomous vehicle.

The vehicle parameter data 205 may include details associated with the autonomous vehicle such as, translational speed, turning speed, engine power, vehicles speed limit, vehicles turning capability, vehicle acceleration limit, vehicle deceleration limit, vehicle tyre pressure and vehicle weight. A person skilled in the art would understand that the scope of the present invention may include any other parameters associated with the vehicle, not mentioned explicitly herein.

The surrounding infrastructure data 207 may include maximum deceleration of trailing and front vehicle, maximum acceleration of trailing and front vehicle, maximum speed difference between vehicles in front and rear, minimum headway distance between front and rear vehicle, time before lane change, collision time gain between front and rear vehicles and minimum lateral distance for overtaking vehicles.

The traffic information 209 may include traffic information received dynamically for a predefined route. The traffic information 209 may be used to calculate the traffic density along the defined route.

The other data 211 may store data, including temporary data and temporary files, generated by modules 213 for performing the various functions of the ECU 103.

In an embodiment, the data 200 in the memory 109 are processed by the one or more modules 213 present within the memory 109 of the ECU 103. In an embodiment, the one or more modules 213 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 213 may be communicatively coupled to the processor 111 for performing one or more functions of the ECU 103. The said modules 213 when configured with the functionality defined in the present disclosure will result in a novel hardware.

In one implementation, the one or more modules 213 may include, but are not limited to a receiving module 215, a location determination module 217, a vehicle parameter determination module 219, a traffic density determination module 221, a prediction module 223, a route selection module 225, a traffic monitoring module 227 and an alternate route determination module 229. The one or more modules 213 may also include other modules 231 to perform various miscellaneous functionalities of the ECU 103. In an embodiment, the other modules 231 may include a configuration module, an Expected Time Arrival (ETA) determination module and a feedback module. The configuration module configures and initializes the autonomous navigation system 101 based on the configuration data 201. The ETA determination module determines expected ETA for the autonomous vehicle based on the one or more predefined vehicle parameters and the calculated distance of the route. The feedback module provides continuous feedback to the ECU 103 on assessing the configuration data 201 and the selected route and provides corrective measures.

The receiving module 215 may receive the data from the IMU unit of the autonomous vehicle for determining the orientation of the autonomous vehicle. The receiving module 215 may receive location information of the autonomous vehicle. Further, the receiving module 215 may receive current traffic information 209 from one of the servers of the plurality of servers 105 based on the predefined route the autonomous vehicle is moving.

The location determination module 217 may determine the current location of the autonomous vehicle based on the orientation and location information of the autonomous vehicle. The location determination module 217 converts the GPS data of the vehicle (V_Lat, V_Long) to UTM north/east $X_{UTM}$, $Y_{UTM}$ point. Further, the location determination module 217 may check if the absolute value of $(X_{V2X}-X_{UTM})$ and $(Y_{V2X}-Y_{UTM})$ is less than or equal to $XPos_{Th}$ and $YPos_{Th}$ respectively. In case, if $(X_{V2X}-X_{UTM})$ and $(Y_{V2X}-$ $Y_{UTM})$ is less than or equal to $XPos_T$, and $YPos_{Th}$ and if $(X_{V2X}>X_{UTM})$ and $(Y_{V2X}>Y_{UTM})$ "X" and "Y" position of the vehicle is determined by adding $(X_{UTM}$ and $XPos_{Th})$ and $(Y_{UTM}+YPos_{Th})$ respectively. Alternatively, the position "X" and "Y" of the vehicle is determined by subtracting $(X_{UTM}$ and $XPos_{Th})$ and $(Y_{UTM}-YPos_{Th})$ respectively. Further, the location determination module 217 checks if absolute value of $(X_{V2X}-X_{UTM})$ and $(Y_{V2X}-Y_{UTM})$ is greater than "x" position of the vehicle and "y" position of the autonomous vehicle respectively. In case, the value of $(X_{V2X}-X_{UTM})$ and $(Y_{V2X}-Y_{UTM})$ is greater than "x" and "y" position of the autonomous vehicle, the location determination module 217 recalculate "x" and "y" position by taking new values of $X_{V2X}$ and $X_{UTM}$. And $(Y_{V2X}$ and $Y_{UT})$ respectively. Thereafter, approximate vehicle location $VehLoc_{Apprx}$ ($VehLoc_{ApprxX}$, $VehLoc_{ApprxY}$) is determined.

The vehicle parameter determination module 219 may determine the one or more pre-defined vehicle parameters and surrounding infrastructure data based on vehicle configuration data. In an embodiment, the one or more predefined vehicle parameters and the surrounding infrastructure data may be used for determining capability of the autonomous vehicle. The predefined vehicle parameters may include, such as, translational speed, turning speed, engine power, vehicles speed limit, vehicles turning capability, vehicle acceleration limit, vehicle deceleration limit, vehicle tyre pressure and vehicle weight. The surrounding infrastructure data may be determined based on the traffic information received from the server of the plurality of server 105 located in the current route of the autonomous vehicle. The traffic information may include number of vehicles in the current route, vehicle type and the like. The surrounding infrastructure data may include, such as, maximum deceleration of trailing and front vehicle, maximum acceleration of trailing and front vehicle, maximum speed difference between vehicles in front and rear, minimum headway distance between front and rear vehicle, time before lane change, collision time gain between front and rear vehicles and minimum lateral distance for overtaking vehicles.

The traffic density determination module 221 may determine the traffic density at the current route of the autonomous vehicle for the predefined time and distance from the current location of the autonomous vehicle, based on the surrounding infrastructure data and the current location of the autonomous vehicle. In an embodiment, the traffic determination module 221 may determine the speed control of the autonomous vehicle based on the traffic density determined for the current route.

The prediction module 223 may predict the traffic density at the one or more alternate routes for the predefined time and distance from the current location of the autonomous vehicle, based on the surrounding infrastructure data for the one or more alternate routes. Additionally, the prediction module 223 may predict the traffic density at the one or more alternate routes based on the threshold distance $(Dist_{Th})$, the threshold Timer $(Timer_{Th})$, an area of the current route and the threshold Field OF View (FOV) area, the speed of the vehicles, direction of the vehicles, area of coverage for traffic density and the like. For example, considering a scenario of an autonomous current vehicle and a target vehicle, where the target vehicle is in front of the autonomous vehicle. In such case, the target vehicle may be considered for traffic density prediction depending on the autonomous vehicle current speed, vehicle speed change and the distance of the target vehicle from the current vehicle.

The route selection module 225 may select the route for navigating the autonomous vehicle based on the one or more pre-defined vehicle parameters, the traffic density at the current route and the traffic density at the one or more alternate routes. The route selection module 225 may determine for each potential vehicle, current velocity and the distance of a target vehicle from the autonomous vehicle. The route selection module 225 determines an achievable retardation acceleration for the autonomous vehicle. Further, the route selection module 225 may determine a navigation change for the vehicle by determining current velocity and the distance of the target vehicle from the vehicle, the achievable retardation/acceleration of the vehicle, and remaining time before touching the target vehicle. Thereafter, the route selection module 225 select the route for safely navigating the autonomous vehicle.

The traffic monitoring module 227 may monitor the traffic density at the selected route for the predefined time and distance. The traffic monitoring module 227 may continuously receive the traffic information from the plurality of servers 105 for the selected route. The traffic monitoring module 227 may monitor time ($Timer_{Mont}$) for monitoring the traffic and determine predicted traffic. Further, the traffic monitoring module 227 monitors if the received traffic and the predicted traffic are same with the threshold limit as shown equation 1 below. Subsequently, the traffic monitoring module 227 may repeat monitoring the time ($Timer_{Mont}$) for monitoring the traffic.

$$\text{Traffic}_{Info}(i) = \text{Traffic}_{Pred}(i) \pm \text{Traffic}_{Th} \quad (1)$$

The alternate route determination module 229 may determine the alternate route for the autonomous vehicle from the one or more alternate routes based on the monitoring by the traffic monitoring module 227. The alternate route determination module 229 may determine if any alternate route from the one or more alternate routes is available based on the priority of the one or more alternate routes and determines the available alternate route as the alternate route for the autonomous vehicle.

Figure 3:
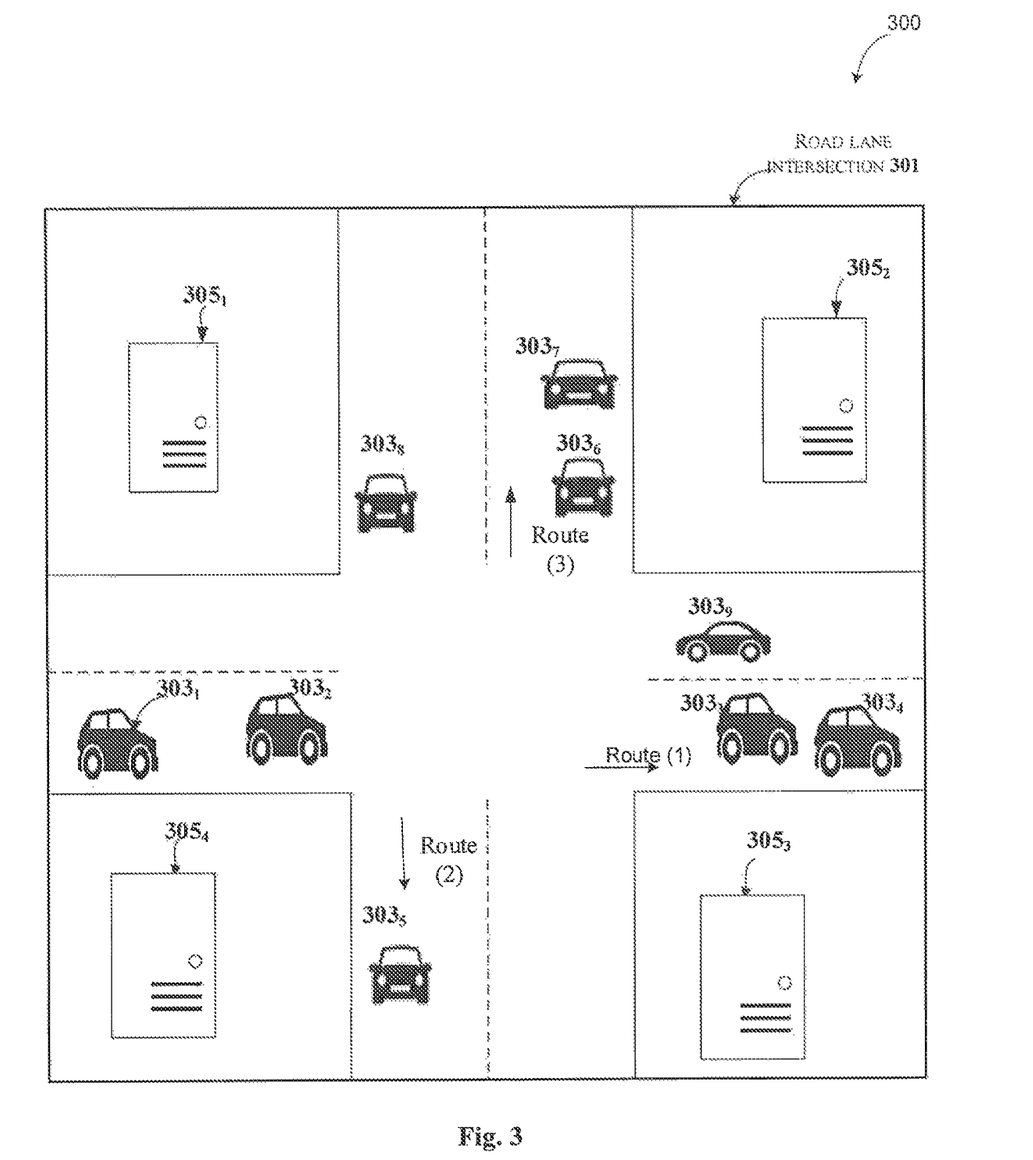
FIG. 3 shows an exemplary representation of a road lane intersection for determining safe navigation of autonomous vehicle in accordance with some embodiments of the present disclosure.

FIG. 3 shows an exemplary representation of a road lane intersection for determining safe navigation of autonomous vehicle in accordance with some embodiments of the present disclosure.

Referring now to FIG. 3, an exemplary representation 300 of a road lane intersection is illustrated. In the FIG. 3, the exemplary representation 300 includes a road lane intersection 301. The road lane intersection 301 includes an autonomous car $303_1$, an autonomous car $303_2$ . . . and an autonomous car $303_9$ (referred as autonomous cars 303) and a server $305_1$, a server $305_2$ . . . server $305_4$ (referred as servers 305). A person skilled in the art would understand that FIG. 3 is an exemplary embodiment and the present disclosure may also include other vehicles and autonomous cars. The autonomous cars 303 are connected to the servers 305 located in the route through communication network such as, V2I. In an embodiment, the autonomous cars 303 communicate to each other through vehicle to vehicle technique. Consider the autonomous car $303_1$ for determining safe navigation. At an instant of time, while the autonomous car $303_1$ is moving, an ECU (not shown explicitly herein) of the autonomous car $303_1$ determines the current location of the autonomous car $303_1$ based on the orientation and location information of the autonomous car $303_1$. In an embodiment, the orientation information is determined based on data from Inertial Measurement Unit sensor of the autonomous car $303_1$. The location information include position ($X_{V2X}$, $Y_{V2X}$) of the autonomous car $303_1$ received from the server $305_1$ present near to the autonomous car $303_1$ and GPS data (V_lat, V_long) for the autonomous car $303_1$. On determining approximate location of the autonomous car $303_1$, the ECU of the autonomous car $303_1$ determines the one or more pre-defined vehicle parameters of the autonomous car $303_1$ and the surrounding infrastructure data. The one or more predefined vehicle parameters may include, for example, translational speed, turning speed, engine power, speed limit, turning capability, acceleration limit, deceleration limit, tyre pressure and weight of the autonomous car $303_1$. Further, the ECU of the autonomous car $303_1$ determine the traffic density at current route of the autonomous car $303_1$ for the predefined time and distance from the current location of the autonomous car $303_1$ based on the surrounding infrastructure data for the current route and the current location of the autonomous car $303_1$. In the present case, the autonomous car $303_1$ is currently moving in route (1) as indicated in FIG. 3. The route (1) includes the autonomous car $303_2$, the autonomous car $303_3$ and the autonomous car $303_4$. Subsequently, the ECU of the autonomous car $303_1$ predicts the traffic density at one or more alternate routes from the current location of the autonomous car $303_1$ based on the surrounding infrastructure data for the one or more alternate routes. Currently, the one or more alternate routes for the autonomous car $303_1$ includes a route (2) and a route (3) as shown in FIG. 3. In an embodiment, based on the traffic density, the alternate route (2) and the alternate route (3) are prioritized. Thereafter, the ECU of the autonomous car $303_1$ selects the route (2) based on the one or more pre-defined vehicle parameters, the traffic density at the route (1), the traffic density at the alternate route (2) and the alternate route (3) for safe navigation. Subsequently, the ECU of the autonomous car $303_1$ may monitor the traffic density at the selected route (2) for a predefined time and distance. Based on the monitoring, the ECU of the autonomous car $303_1$ may further determine an alternate route for the autonomous car $303_1$. In an embodiment, an expected ETA for the autonomous car $303_1$ is determined based on the one or more pre-defined vehicle parameters and a calculated distance of the route (1).

Figure 4:
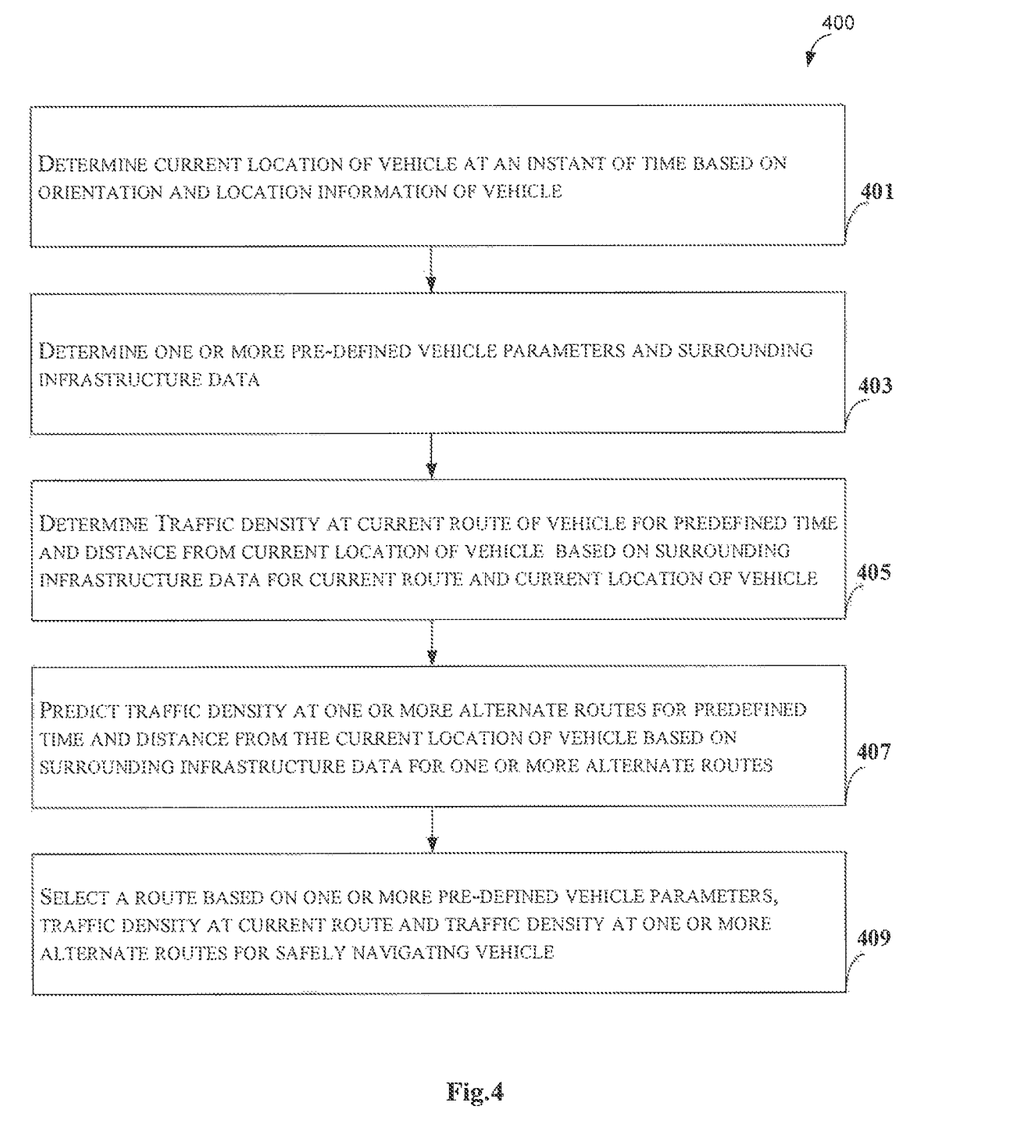
FIG. 4 illustrates a flowchart showing a method for determining safe navigation of autonomous vehicle in accordance with some embodiments of present disclosure.

FIG. 4 illustrates a flowchart showing a method for determining safe navigation of autonomous vehicle in accordance with some embodiments of present disclosure.

As illustrated in FIG. 4, the method 400 includes one or more blocks for determining safe navigation of autonomous vehicle. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, current location of the autonomous vehicle is determined by the location determination module 217 at the instant of time based on the orientation and location information of the autonomous vehicle.

At block 403, the one or more pre-defined vehicle parameters and the surrounding infrastructure data is determined by the vehicle parameter determination module 219.

At block 405, the traffic density at current route of the autonomous vehicle is determined by the traffic density determination module 221 for the predefined time and distanced from the current location of the autonomous vehicle, based on the surrounding infrastructure data for the current route and the current location of the autonomous vehicle.

At block 407, the traffic density at one or more alternate routes for a predefined time and distance from the current location of the autonomous vehicle is predicted by the prediction module 223 based on the surrounding infrastructure data for the one or more alternate routes.

At block 409, the route is selected by the route selection module 225 based on the one or more predefined vehicle parameters, the traffic density at the current route and the traffic density at the one or more alternate routes for safely navigating the vehicle.

An embodiment of the present disclosure determines safe navigation path for the autonomous vehicles.

An embodiment of the present disclosure controls autonomous vehicles while passing through lane intersections.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| REFERRAL NUMERALS: | |
| --- | --- |
| Reference number | Description |
| 100 | Environment |
| 101 | Autonomous navigation system |
| 103 | ECU |
| 105 | Plurality of servers |
| 107 | I/O interface |
| 109 | Memory |
| 111 | Processor |
| 200 | Data |
| 201 | Configuration data |
| 203 | Vehicle location data |
| 205 | Vehicle parameter data |
| 207 | Surrounding infrastructure data |
| 209 | Traffic information |
| 211 | Other data |
| 213 | Modules |
| 215 | Receiving module |
| 217 | Location determination module |
| 219 | Vehicle parameter determination module |
| 221 | Traffic density determination module |
| 223 | Prediction module |
| 225 | Route selection module |
| 227 | Traffic monitoring module |
| 229 | Alternate route determination module |
| 231 | Other modules |
| 301 | Road lane intersection |
| 303 | Autonomous cars |
| 305 | Servers |

What is claimed is:

1. A method for determining safe navigation of an autonomous vehicle, the method comprising:

when an autonomous vehicle starts moving, configuring, by an Electronic Control Unit (ECU), the autonomous vehicle based on a plurality of configuration parameters, wherein the plurality of configuration parameters comprise threshold co-ordinate positions ($X_{TH}$ and $Y_{TH}$) determined by calculating a difference between co-ordinate positions from GPS data and co-ordinate positions received from a server of a plurality of servers;

determining, by the ECU, a current location of the autonomous vehicle, at an instant of time, based on the threshold co-ordinate positions ($X_{TH}$ and $Y_{TH}$), orientation information, and location information of the autonomous vehicle;

determining, by the ECU, one or more predefined vehicle parameters and surrounding infrastructure data;

determining, by the ECU, traffic density at current route of the autonomous vehicle for a predefined time and distance from the current location of the autonomous vehicle, based on the surrounding infrastructure data for the current route and the current location of the autonomous vehicle;

predicting, by the ECU, traffic density at one or more alternate routes for a predefined time and distance from the current location of the autonomous vehicle, based on the surrounding infrastructure data for the one or more alternate routes; and selecting, by the ECU, a route for navigating the autonomous vehicle based on the one or more predefined vehicle parameters of the autonomous vehicle, the traffic density at the current route, and the traffic density at the one or more alternate routes for safely navigating the autonomous vehicle.

2. The method as claimed in claim 1, wherein the orientation information is determined based on data from an Inertial Measurement Unit sensor.

3. The method as claimed in claim 1, wherein the one or more predefined vehicle parameters comprises translational speed, turning speed, engine power, vehicle speed limit, vehicle turning capability, vehicle acceleration limit, vehicle deceleration limit, vehicle tyre pressure, and vehicle weight.

4. The method as claimed in claim 1, wherein the surrounding infrastructure data comprises maximum deceleration of trailing and front vehicle, maximum acceleration of the trailing and the front vehicle, maximum speed difference between vehicles in front and rear, minimum headway distance between front and rear vehicle, time before lane change, collision time gain between front and rear vehicles, and minimum lateral distance for overtaking vehicles.

5. The method as claimed in claim 1, further comprising prioritizing the one or more alternate routes based on the traffic density at the one or more alternate routes.

6. The method as claimed in claim 1, wherein the traffic density at the one or more alternate routes is predicted based on a threshold time, a threshold distance, a threshold Field of View (FOV), a location, an orientation and speed details of vehicles in the one or more alternate routes, distance between the autonomous vehicle and vehicles in the one or more alternate routes and distance and an area of the one or more alternate routes.

7. The method as claimed in claim 1, further comprising providing continuous feedback by assessing the plurality of configuration parameters and the selected route for the autonomous vehicle.

8. The method as claimed in claim 1, further comprising determining speed control for the autonomous vehicle based on the traffic density at the current route.

9. The method as claimed in claim 1, further comprising determining an Expected Time Arrival (ETA) for the autonomous vehicle based on the one or more predefined vehicle parameters and a calculated distance of the route.

10. The method as claimed in claim 1, further comprising monitoring the traffic density at the selected route for the predefined time and distance.

11. The method as claimed in claim 10, further comprising determining an alternate route for the autonomous vehicle from the one or more alternate routes based on the monitoring.

12. An Electronic Control Unit (ECU) of an autonomous vehicle for determining safe navigational path based on traffic condition, comprising:
a processor; and
a memory communicatively coupled to the processor, wherein the memory stores processor-executable instructions, which, on execution, causes the processor to:
when an autonomous vehicle starts moving, configure the autonomous vehicle based on a plurality of configuration parameters, wherein the plurality of configuration parameters comprise threshold co-ordinate positions ($X_{TH}$ and $Y_{TH}$) determined by calculating a difference between co-ordinate positions from GPS data and co-ordinate positions received from a server of a plurality of servers determine a current location of the vehicle, at an instant of time, based on the threshold co-ordinate positions ($X_{TH}$ and $Y_{TH}$), orientation information, and location information of the vehicle;
determine one or more predefined vehicle parameters and surrounding infrastructure data;
determine traffic density at current route of the autonomous vehicle for a predefined time and distance from the current location of the autonomous vehicle, based on the surrounding infrastructure data for the current route and the current location of the autonomous vehicle;
predict traffic density at one or more alternate routes for a predefined time and distance from the current location of the autonomous vehicle, based on surrounding infrastructure data for the one or more alternate routes; and
select a route for navigating the autonomous vehicle based on the one or more predefined vehicle parameters of the autonomous vehicle, the traffic density at the current route, and the traffic density at the one or more alternate routes for safely navigating the autonomous vehicle.

13. The ECU as claimed in claim 12, wherein the processor is configured to determine the orientation information based on data from an Inertial Measurement Unit sensor.

14. The ECU as claimed in claim 12, wherein the one or more predefined vehicle parameters comprises translational speed, turning speed, engine power, vehicle speed limit, vehicle turning capability, vehicle acceleration limit, vehicle deceleration limit, vehicle tyre pressure, and vehicle weight.

15. The ECU as claimed in claim 12, wherein the surrounding infrastructure data comprises maximum deceleration of trailing and front vehicle, maximum acceleration of the trailing and the front vehicle, maximum speed difference between vehicles in front and rear, minimum headway distance between front and rear vehicle, time before lane change, collision time gain between front and rear vehicles, and minimum lateral distance for overtaking vehicles.

16. The ECU as claimed in claim 12, wherein the processor is further configured to prioritize the one or more alternate routes based on the traffic density at the one or more alternate routes.

17. The ECU as claimed in claim 12, wherein the traffic density at the one or more alternate routes is predicted based on a threshold time, a threshold distance, a threshold Field of View (FOV), a location, an orientation and speed details of vehicles in the one or more alternate routes, distance between the autonomous vehicle and vehicles in the one or more alternate routes and distance and an area of the one or more alternate routes.

18. The ECU as claimed in claim 12, wherein the processor is further configured to provide continuous feedback by assessing the plurality of configuration parameters and the selected route for the autonomous vehicle.

19. The ECU as claimed in claim 12, wherein the processor is further configured to determine speed control for the autonomous vehicle based on the traffic density at the current route.

20. The ECU as claimed in claim 12, wherein the processor is further configured to determine an Expected Time Arrival (ETA) for the autonomous vehicle based on the one or more predefined vehicle parameters and a calculated distance of the route.

21. The ECU as claimed in claim 12, wherein the processor is further configured to monitor the traffic density at the selected route for the predefined time and distance.

22. The ECU as claimed in claim 21, wherein the processor is further configured to determine an alternate route for the autonomous vehicle from the one or more alternate routes based on the monitoring.

23. A non-transitory computer readable medium comprising instructions stored thereon that when processed by at least one processor cause an Electronic Control Unit (ECU) of an autonomous vehicle to perform operations comprising:
when an autonomous vehicle starts moving, configuring the autonomous vehicle based on a plurality of configuration parameters, wherein the plurality of configuration parameters comprise threshold co-ordinate positions ($X_{TH}$ and $Y_{TH}$) determined by calculating a difference between co-ordinate positions from GPS data and co-ordinate positions received from a server of a plurality of servers;
determining a current location of the autonomous vehicle, at an instant of time, based on the threshold co-ordinate positions ($X_{TH}$ and $Y_{TH}$), orientation information, and location information of the autonomous vehicle;
determining one or more predefined pre defined vehicle parameters and surrounding infrastructure data;
determining traffic density at current route of the autonomous vehicle for a predefined time and distance from the current location of the autonomous vehicle, based on the surrounding infrastructure data for the current route and the current location of the autonomous vehicle;
predicting traffic density at one or more alternate routes for a predefined time and distance from the current location of the autonomous vehicle, based on the surrounding infrastructure data for the one or more alternate routes; and
selecting a route for navigating the autonomous vehicle based on the one or more predefined vehicle parameters of the autonomous vehicle, the traffic density at the current route, and the traffic density at the one or more alternate routes for safely navigating the autonomous vehicle.

24. The medium as claimed in claim 23, wherein the orientation information is determined based on data from an Inertial Measurement Unit sensor.

25. The medium as claimed in claim 23, wherein the one or more predefined vehicle parameters comprises translational speed, turning speed, engine power, vehicle speed limit, vehicle turning capability, vehicle acceleration limit, vehicle deceleration limit, vehicle tyre pressure, and vehicle weight.

26. The medium as claimed in claim 23, wherein the surrounding infrastructure data comprises maximum deceleration of trailing and front vehicle, maximum acceleration of the trailing and the front vehicle, maximum speed difference between vehicles in front and rear, minimum headway distance between front and rear vehicle, time before lane change, collision time gain between front and rear vehicles, and minimum lateral distance for overtaking vehicles.

27. The medium as claimed in claim 23, wherein the instructions further cause the at least one processor to prioritize the one or more alternate routes based on the traffic density at the one or more alternate routes.

28. The medium as claimed in claim 23, wherein the instructions further cause the at least one processor to predict the traffic density at the one or more alternate routes based on a threshold time, a threshold distance, a threshold Field of View (FOV), a location, an orientation and speed details of vehicles in the one or more alternate routes, distance between the autonomous vehicle and vehicles in the one or more alternate routes and distance and an area of the one or more alternate routes.

29. The medium as claimed in claim 23, wherein the instructions further cause the at least one processor to provide continuous feedback by assessing the plurality of configuration parameters and the selected route for the autonomous vehicle.

30. The medium as claimed in claim 23, wherein the instructions further cause the at least one processor to determine speed control for the autonomous vehicle based on the traffic density at the current route.

31. The medium as claimed in claim 23, wherein the instructions further cause the at least one processor to determine an Expected Time Arrival (ETA) for the autonomous vehicle based on the one or more predefined vehicle parameters and a calculated distance of the route.

32. The medium as claimed in claim 23, wherein the instructions further cause the at least one processor to monitor the traffic density at the selected route for the predefined time and distance.

33. The medium as claimed in claim 32, wherein the instructions further cause the at least one processor to determine an alternate route for the autonomous vehicle from the one or more alternate routes based on the monitoring.

* * * * *